United States Patent [19]

Mills

[11] Patent Number: 4,850,205
[45] Date of Patent: Jul. 25, 1989

[54] OVERRUN CONTROL DEVICE

[76] Inventor: John W. Mills, 301 S. Idaho, Columbus, Kans. 66725

[21] Appl. No.: 254,090

[22] Filed: Oct. 6, 1988

[51] Int. Cl.$^4$ .............................................. A23G 9/20
[52] U.S. Cl. ...................................... 62/308; 62/342; 261/76; 261/DIG. 75
[58] Field of Search .................................. 62/306–308, 62/342; 261/76, DIG. 75

[56] References Cited

U.S. PATENT DOCUMENTS

| | | | |
|---|---|---|---|
| 1,993,130 | 3/1935 | Ballew | 62/307 |
| 3,183,681 | 5/1965 | Lutz et al. | 62/342 X |
| 3,304,737 | 2/1967 | Strutynski | 62/306 X |
| 3,317,198 | 5/1967 | Phelan et al. | 62/342 X |
| 3,464,220 | 9/1969 | Phelan | 62/342 |
| 4,221,117 | 9/1980 | Martineau | 62/306 |
| 4,308,138 | 12/1981 | Woltman | 261/DIG. 75 X |
| 4,329,853 | 5/1982 | Mills | 62/308 |
| 4,412,428 | 11/1983 | Giannella et al. | 62/308 |
| 4,617,802 | 10/1986 | Fiedla | 62/308 X |
| 4,793,151 | 12/1988 | Masel et al. | 62/306 |

Primary Examiner—William E. Tapolcai
Attorney, Agent, or Firm—Edward L. Brown, Jr.

[57] ABSTRACT

In a soft-serve ice cream dispensing machine of the gravity feed type containing an overrun control device for controlling the amount of air ingested into the liquid mix while retaining the entrapped in a standby condition, the device including a tubular member with a longitudinal air passageway positioned with its lower end communicating between the mixing chamber and reservoir, its upper end extending above the fluid level in the reservoir, a mixing chamber within the device concentrically positioned in the air passageway with a plurality of lateral openings in the device extending into the mixing chamber allowing liquid mix to enter the mixing chamber and a venturi means in the air passageway downstream of the mixing chamber having a throat section and an air induction tube intersecting the throat section and extending above the level of the reservoir to permit additional air to be drawn into the air passageway due to the increased velocity in the throat area.

11 Claims, 2 Drawing Sheets

OVERRUN CONTROL DEVICE

This invention pertains generally to machines for freezing and dispensing a frozen confectionery product particularly soft ice cream, sometimes referred to as "ice milk" of "soft serve". The machine takes a liquid mix and aerates the mix through beating while cooling to a semi-frozen state. The machine basically consists of a freezing chamber, liquid product reservoir located above the freezing chamber and a communicating line between the reservoir and the freezing chamber which contains an "overrun" control device for controlling the amount of air ingested into the liquid mix flowing to the freezing chamber so as to insure the proper "overrun" or percentage of air by volume in the resultant confectionery product while retaining the entrapped air in the product in a standby condition.

BACKGROUND OF THE INVENTION

Ice cream evolved from iced beverages and fruit ices in early medieval times, some of which contained milk or cream. They were cooled with ice or snow containing salt and were quite popular in Europe in the mid 18th century. The first hard ice cream in the United States was produced in household machines and not until mid 19th century when milk dealers produced and sold ice cream as a luxury confectionery was it commercially sold. The hard and soft ice cream industry today utilizes approximately 9% of the total U.S. milk production in their products. Packaged hard ice cream has approximately a 100% overrun, which means the liquid mix has increased its volume 100%, and is served in a temperature range between 5° F. and 10° F. Soft ice cream has lesser overrun in the range of 50% and a serving temperature range of 20° F. to 22° F.

The first soft-serve machines were developed in the 1930's which were of the batch type and produced a batch of soft ice cream which was later hand-dipped since these earlier freezers were not specifically designed for serving the product directly from the machine. Since the soft-serve product was served at a much warmer temperature, the required content of butterfat and sugar was much less since the taste buds of the consumer were more sensitive at that warmer temperature. Hard ice cream contains approximately 10% butterfat, while soft-serve is in the range from 2 to 4%. Later-developed soft serve machines generally included a freezing cylinder with a rotary-dasher assembly. The dasher assembly included a scraper blade for removing the frozen product from the inside surface of the freezing chamber as it forms and an auger-shaped dasher blade which not only beats air into the mix but also forces the product to the dispensing end of the freezing chamber in a pumping action. Positioned above the freezing chamber is a reservoir containing a suitable mix in liquid form which when frozen and aerated sufficiently will yield the desired flavor and texture. The beating or whipping action of the dasher also thoroughly mixes the product with that being frozen on the surface of the freezer chamber to maintain a uniform temperature and texture throughout the chamber.

The freezing chamber and liquid product reservoir are typically connected in some manner so as to permit a suitable amount of new liquid product to move from the reservoir to the freezing chamber at the same time as frozen product is being dispensed from the freezing cylinder. In machines of the type which the present invention applies, the freezing chamber and reservoir are connected by an overrun control device which controls the amount of liquid mix and air which is drawn into the freezing cylinder. The common failing of prior gravity fed overrun control devices has been their inability to obtain and retain the proper "overrun" in the dispensed product.

When the frozen product is not being dispensed from the freezing cylinder, the machine must periodically cycle on and off so as to correctly maintain the temperature and texture of the frozen product in the freezing chamber. When the machine cycles on, the beater or dasher also runs in order to keep the frozen product cold and mixed so that it is ready for dispensing. As the machine remains in this "standby" condition for any extended period of time, the resultant product when finally dispensed will not contain as much air as it should and the result will lack proper taste and appear grainy. Typically, machines of this type will maintain an "overrun" in a range between 30% and 40% which is much less than the optimum 50% overrun condition. Various solutions have been suggested for holding overrun in the standby condition including the use of pumps for introducing pressurized or compressed air into the freezing chamber. Examples of machines using an external air pressure device are to be found in U.S. Pat. Nos. 3,196,633, 3,147,601 and 2,565,121. The disadvantages of the addition of such elaborate pumping devices is the increased energy which is required to run the machines, problems of mechanical failure and the difficulty in disassembling and cleaning.

The present invention adapts to a machine of the type referred to as gravity fed or non-mechanical which depend upon differences between pressure inside the freezing cylinder and atmospheric pressure above the mix in the mix tank. When product is drawn from the machine, pressure inside the cylinder is reduced and the mix is automatically metered into the freezing cylinder until a stable level is reached with no mechanical valves between the freezing cylinder and the liquid mix in the elevated reservoir.

SUMMARY OF THE INVENTION

The invention generally comprises an improved mix overrun control device for controlling the flow of entrapped air and liquid product through the communicating line between the reservoir and the freezing chamber and retaining the entrapped in the product within the freezing chamber during standby conditions.

The mix overrun device comprises a tubular member with a longitudinal air passageway therethrough positioned with its lower portion in the communicating line and its upper portion extending up through the fluid level in the reservoir. The tubular member includes a mixing chamber concentrically positioned in the air passageway with lateral openings extending outwardly therefrom opening into the reservoir. The tubular member further includes a venturi means positioned in the air passageway downstream of the mixing chamber having a throat section, an upstream transition section and a downstream transition section. There is an air induction tube intersecting the throat section of the venturi and extending above the level of the reservoir fluid for allowing additional air to be drawn into the air passageway due to the Bernoulli effect as the liquid product is drawn into the freezing chamber. Air is also drawn into the mixing chamber through the longitudinal air passageway which also extends above the fluid level of the reservoir.

The principal object of the present invention is to provide an improved mix overrun device which also maintains "overrun" within the freezing chamber during standby conditions.

Another object of the present invention is to provide a mix overrun device in a gravity fed system without valves which is simple and readily cleanable.

Another object of the present invention is to provide an overrun control device which retains entrapped air within the freezing cylinder through surface tension and head pressure of the fluid standing in the control device.

Another object of the present invention is to provide an overrun control device which handles mixes having a wide range of viscosity while retaining an acceptable overrun percentage.

Other features and advantages of the invention will become apparent upon consideration of the following discussion of the accompanying figures illustrating certain preferred embodiments of the invention.

DESCRIPTION OF THE PREFERRED EMBODIMENTS

Figure 1:
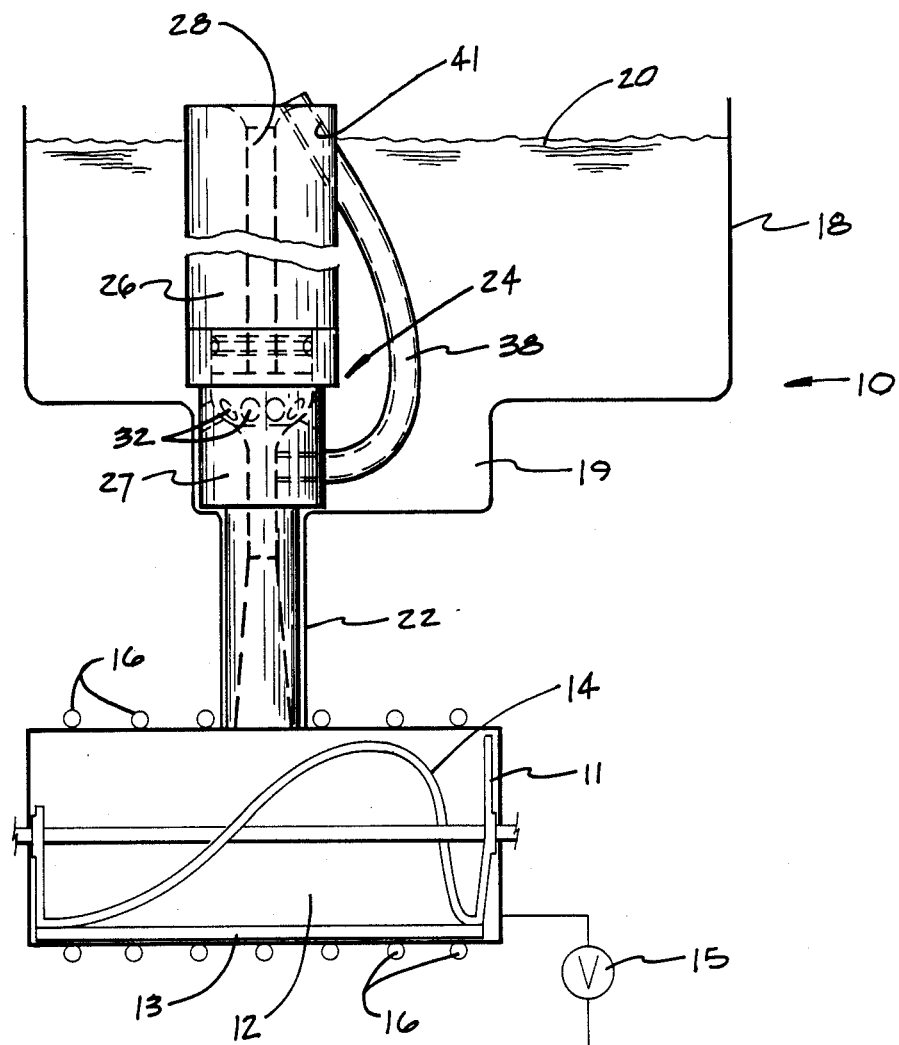
FIG. 1 is a side elevational view of a soft-serve ice cream machine with portions in section to illustrate the location of the mix overrun device of the present invention.

A machine for freezing and dispensing confectionery products, such as soft-serve ice cream, milk shakes and the like is generally illustrated by reference numeral 10. The machine 10 includes a freezing chamber 12 within which the ice cream product is frozen and stored until dispensed through valve 15 for consumption. Located within freezing chamber 12 is a dasher 14 and a scraper blade 13. The blade 13 scrapes the frozen product from the cylinder wall which is cooled by refrigerator coils 16 while the dasher 14 whips the product towards the front end of the freezing cylinder. At the same time dasher 14 whips air into the product which is also referred to as "overrun" which has heretofore been described. The auger face 11 of the dasher 14 pumps the product through dispensing valve 15 when it is in motion and the valve is open. The function and operation of freezing chamber 12 is well-known in the prior art and therefore not described in detail.

Figure 2:
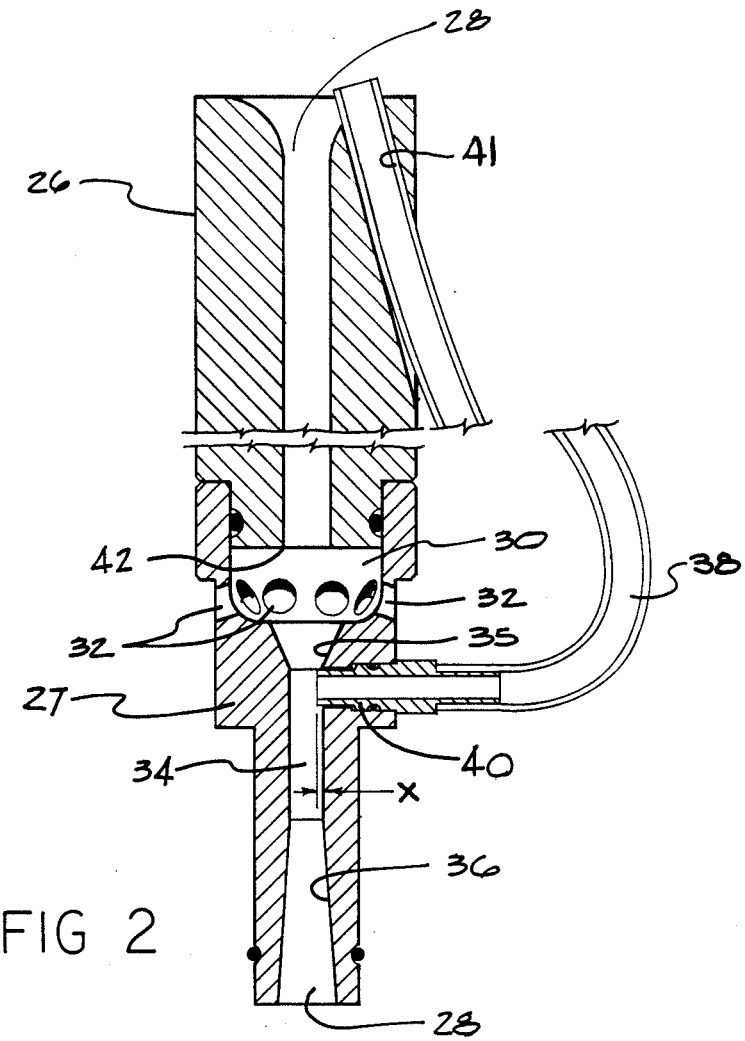
FIG. 2 is a longitudinal sectional view of the mix overrun to an enlarged scale and FIG. 3 is a longitudinal section of a modified form of the present invention.
Figure 3:
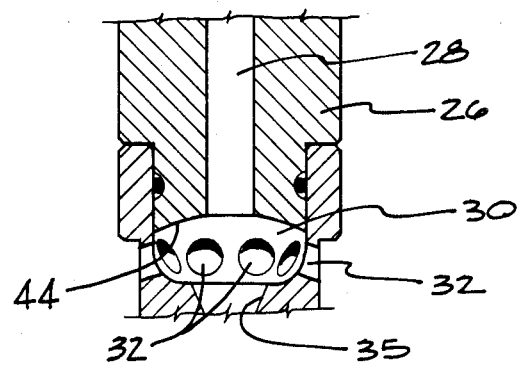

The machine 10 also includes a liquid mix reservoir 18 located above the freezing chamber 12 in which the liquid mix 20 is stored for gravity flow. A connecting tube 22 connects the sump 19 of the reservoir with the freezing chamber 12. Inserted in connecting tube 22 is the overrun control device 24, also referred to as a carburetor. Device 24 includes a longitudinal air passageway 28. Carburetor 24 comprises an upper section 26 and a lower section 27, which has a reduced diameter section, inserted in connecting tube 22. Located in the center of carburetor 24 is a circular shaped mixing chamber 30 which has a series of radially extending openings 32 which permit the liquid mix from reservoir 18 to enter the carburetor 24. Positioned just downstream of mixing chamber 30 is a venturi including a throat section 34 positioned between and upstream transition section 35 and a downstream transition section 36. Intersecting throat section 34 is an air induction tube 38. Located on the end of induction tube 38 is a fitting 40 having an end opening which can be adjustably extended into the throat section 34 a distance X. The upper end of induction tube 38 engages a passage 41 in the upper section 26 of the carburetor and terminates above the fluid level of the reservoir. The mixing chamber 30 is contained within the lower section 27 of the carburetor while the bottom surface 42 of the upper section 26 forms the top of the mixing chamber 30. Positioned immediately downstream of mixing chamber 30 is an upstream transition section 35 of the venturi which converges into throat section 34. Throat section 34 in turn joins with a downstream transition section 36 which diverges towards the lower end of the carburetor 24, as seen in FIG. 2. FIG. 3 illustrates a modified form of the mixing chamber 30' which has a concave upper surface 44. This shape of chamber has a tendency to better hold the overrun in a standby condition.

OPERATION

When the dispensing valve 15 is open to draw frozen product from freezing chamber 12, liquid product 20 will flow from the reservoir 18 into freezing chamber 12 by gravity and suction to replace the displaced product. After the static fluid which was standing in central air passage 28 and air induction tube 38, flow out of carburetor 24, air will be drawn into mixing chamber 30 through central air passageway 28. Additional air will be drawn into the flowing fluid in the throat section 34 of the central passageway 28 through tube 38. Due to the increased velocity of the fluid through the smaller throat area 34, the pressure at the end of air induction tube 38 will be reduced by reason of the Bernoulli effect. This reduced pressure at the end of air induction tube 38 enhances the suction of air through tube 38 thereby increasing the amount of air being sucked into the freezing chamber 12. The suction in the freezing chamber due to the displaced product allows mix fluid 20 to enter each of the eight openings 32 positioned around the periphery of the mixing chamber 30.

In the standby condition, when the temperature sufficiently warms in the freezing chamber 12, the dashers will cycle on to beat and stir the ice cream within the freezing chamber while the refrigeration coils 16 will cycle cooled refrigerant to again bring the ice cream contained therein back to its 18° F. serving temperature. Since the valve 15 is not open during standby cycling of the dasher 14, no additional air is drawn through the carburetor 24 due to displaced ice cream.

The entrapped air within the ice cream and freezing cylinder is prevented from rising in carburetor 24 due to the slight head pressure from reservoir 18 and the surface tension of the fluid and bubbles within the carburetor 24. The size and number of the eight holes 32 enhance the surface tension and improve the retention of air, as does the volume of the mixing chamber 30.

If the mixing chamber 30 is substantially larger or smaller than its full scale size, as shown in FIG. 2, it will not hold the air or "overrun" as well in a standby condition.

Increasing the distance X that the air induction tube 38 extends into the throat 34, such as 0.010 inches, can increase the amount of "overrun" with liquid mixes with differing viscosities.

Although the invention has been described in considerable detail with reference to certain preferred embodiments thereof, it will be understood that variations and modifications can be effected within the spirit and scope of the invention as described above and as defined in the appended claims.

I claim:

1. In an apparatus for freezing and dispensing a soft confectionery product, the apparatus including a freezing and mixing chamber having a dasher, a liquid product reservoir and a communicating line between the reservoir and the freezing chamber; the improvement comprising an improved overrun control device removably positioned in said communicating line for supplying a proper proportion of air and liquid to the freezing chamber while retaining the entrapped air in the semi-frozen product in a standby condition, the device comprising:

a tubular member with a longitudinal air passageway therethrough positioned with its lower portion in the communicating line and its upper portion extending up through the fluid level in the reservoir;

a mixing chamber in the tubular member concentrically positioned in the air passageway;

a plurality of lateral openings in the member extending into the mixing chamber, allowing the liquid product to enter the mixing chamber;

a venturi means in the air passageway downstream of the mixing chamber having a throat section and upstream transition section and downstream transition section;

an air induction tube intersecting the throat section and extending above the level of the reservoir for allowing additional air to be drawn into the air passageway due to the Bernoulli effect as the liquid product is drawn into the freezing chamber.

2. In an overrun control device as set forth in claim 1, wherein the upstream transition section is adjacent the mixing chamber and the throat section length is approximately twice its diameter.

3. In an overrun control device as set forth in claim 1, wherein the mixing chamber is circular in cross section with a diameter between three to six times the diameter of the longitudinal air passageway with at least four lateral openings therein.

4. In an overrun control device as set forth in claim 1, wherein the upstream transition section opens into the mixing chamber and the throat section length is approximately twice its diameter and the mixing chamber is circular in cross section with the diameter between three to six times the diameter of the longitudinal air passageway with at least four lateral openings therein.

5. In an overrun control device as set forth in claim 1, wherein the air induction tube can be adjustably positioned in the throat section so that the end of the air induction tube extends to different depths in the throat section.

6. In an overrun control device as set forth in claim 1, wherein the upstream transition opens into the mixing chamber and the air induction tube intersects the throat section approximate the upstream end of the throat section.

7. In an overrun control device as set forth in claim 1, wherein the upstream transition opens into the mixing chamber and the air induction tube intersects the throat section approximate the upstream end of the throat and the upper end of the air induction tube is positioned in a passage in the upper end of the tubular member adjacent the upper end of the air passageway.

8. In an overrun control device as set forth in claim 1, wherein the upper end of the air induction tube joins a passage in the tubular member and is positioned approximate the upper end of the air passageway.

9. In an overrun control device as set forth in claim 1, the upstream transition opens into the mixing chamber which has a diameter at least three times that of the air passageway and there are at least six lateral openings in the member, the throat section having a length approximately three times its diameter with the air induction tube intersecting approximate the upstream end of the throat.

10. In an overrun control device as set forth in claim 1, wherein the longitudinal air passageway, mixing chamber, lateral openings and air induction tube all have sufficient surface area relative to volume to create adequate back pressure due to surface tension with the standing liquid in the product reservoir to prevent entrapped air in the freezing chamber from escaping to atmosphere in the standby condition.

11. In an overrun control device as set forth in claim 1, wherein the mixing chamber has a top surface which is concave.

* * * * *